UNITED STATES PATENT OFFICE.

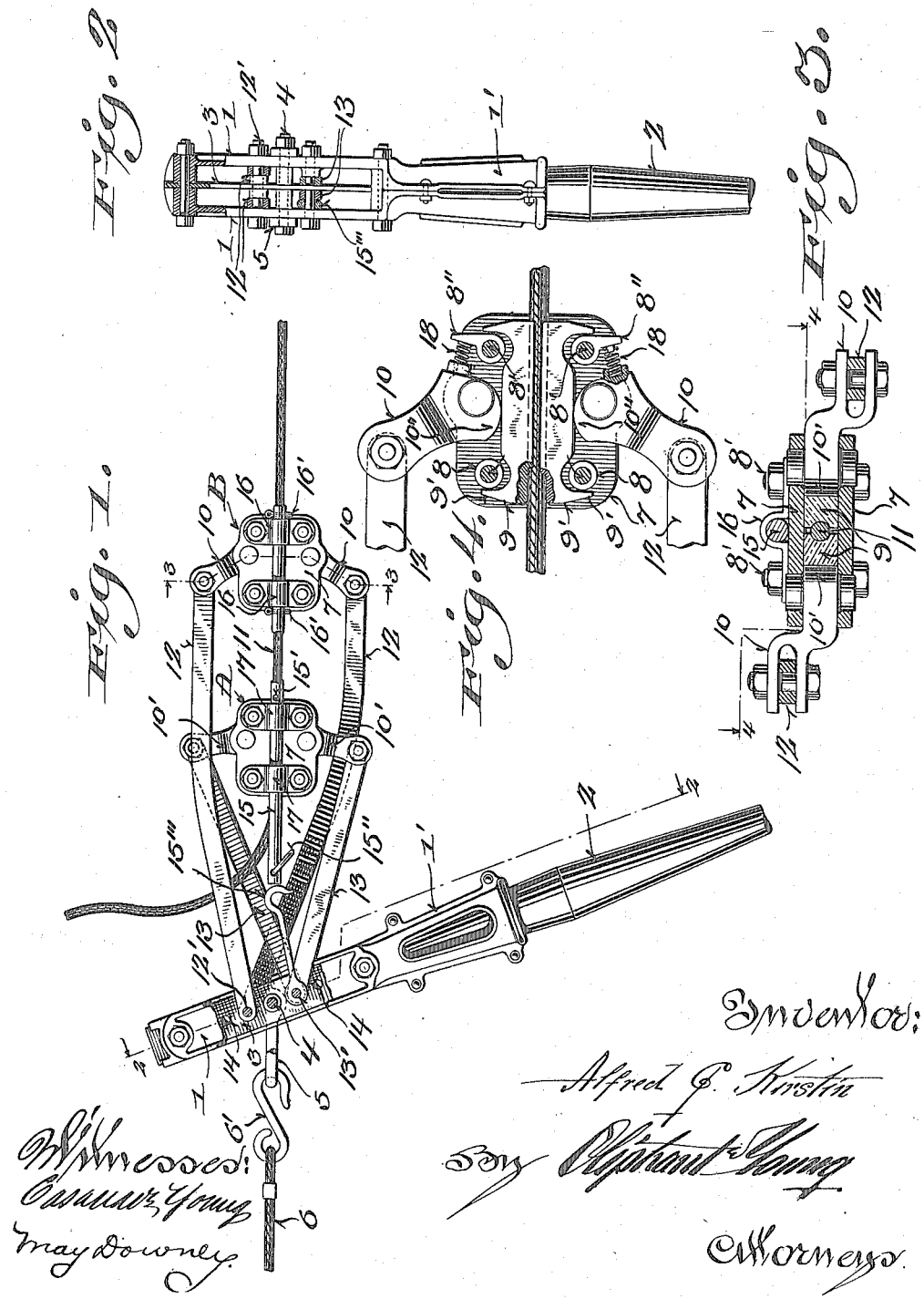

ALFRED J. KIRSTIN, OF ESCANABA, MICHIGAN.

SLACK-TAKE-UP MECHANISM.

1,143,713.     Specification of Letters Patent.     Patented June 22, 1915.

Application filed January 9, 1915. Serial No. 1,325.

*To all whom it may concern:*

Be it known that I, ALFRED J. KIRSTIN, a citizen of the United States, and resident of Escanaba, in the county of Delta and State of Michigan, have invented certain new and useful Improvements in Slack-Take-Up Mechanism; and I do hereby declare that the following is a full, clear, and exact description thereof.

My invention has for its object to provide a simple, economical and effective slack take-up mechanism for any type of runner, the same being particularly applicable for pulling stumps or the like.

Primarily my invention contemplates the employment of a pair of independent oscillatory clutch blocks in link connection with an actuating lever, which actuating lever, under ordinary conditions, is anchored to a suitable runner in the form of a cable stretch, while the clutch members are adapted to engage the free end of a second runner, which second runner is attached to the stump to be pulled. Thus, by imparting an oscillatory movement to the actuating lever, the clutch blocks will, through their connections, alternately engage the stump connected runner, whereby the said runner is intermittently gripped and drawn through the clutch blocks to thus extract the stump by imparting the desired force in a series of impulses.

With the above objects in view the invention consists in certain peculiarities of construction and combination of mechanical elements as set forth hereinafter with reference to the accompanying illustrations and subsequently claimed.

In the drawings Figure 1 represents an elevation of a mechanism embodying the features of my invention, the same being conveniently arranged as a stump puller, with parts broken away to more clearly illustrate certain details of construction; Fig. 2, a longitudinal sectional view of the same, the section being indicated by line 2—2 of Fig. 1; Fig. 3, an enlarged detailed cross-section of one of the clutch blocks, the section being indicated by line 3—3 of Fig. 1, and Fig. 4, a sectional face view of the same, the section being indicated by line 4—4 of Fig. 3.

Referring by characters to the drawings, 1 represents the head of an actuating lever, which head is provided with a socket 1' for a handle extension 2. The head, for simplicity and convenience in construction, is formed in two parts suitably bolted together and recessed, as shown, the side plates of said recessed portion being divided by partition plate 3. The side plates and partition plate have mounted therein a pivot bolt 4, which bolt carries an oscillatory clip 5 that is adapted to be connected by an anchor runner in the form of a cable 6 by a suitable link 6', whereby the pivot bolt or point of oscillation of said lever is suitably fixed.

Associated with the actuating lever is a pair of tangentially arranged clutch blocks A, B. Each of these clutch blocks comprise a pair of cheek-plates 7 which are suitably spaced apart and secured by thimbled bolts 8, 8'. The thimbled bolts 8 and 8' serve as guides for independent jaws 9, 9, which jaws are loosely mounted between the cheek-plates having tail-pieces 9' that engage the thimbled bolts, whereby lateral movement of said jaws is limited. The clutch-block B has fulcrumed therein a pair of cam levers 10 and the clutch block A a corresponding pair of cam levers 10'. Each set of these cam levers are arranged to impinge against a related jaw 9, whereby the said jaws are caused to be forced together for gripping engagement with the free end of a runner in the form of a cable 11. The opposite end of this runner (not shown) is adapted to be secured to the stump to be pulled in any suitable manner. The outer ends of the cam levers 10 are connected by links 12 to the head 1 of the actuating lever by a bolt 12' and the corresponding ends of the cam levers 10' are connected by links 13 to the head 1 of said lever by bolts 13', which bolts are positioned below the axis of oscillation of the actuating lever, while the carrying bolts 12' of the other set of links are positioned above the point of oscillation. The bolts 12', 13', as best shown in Fig. 1, are arranged to be adjusted with respect to the pivot bolt 4 and for this purpose the side-plates and partition plate 3 of the head are formed with one or more series of bolt-receiving apertures 14, whereby the link-supporting bolts can be moved in or out to vary the movement imparted to said links and their associated clutch blocks.

In order to facilitate the operation of the mechanism the pair of clutch blocks A, B, are connected by a guide in the form of a rod 15, which rod is fixed to one of the cheek-pieces 7 of the clutch block B by clip members 16, endwise movement of said rod with relation to the clip members being provided against by cotter-pins 16' which are fitted in apertures with which the guide-rod is equipped. The clutch block A is slidably mounted upon the projecting end of the guide-rod 15 by clip members 17, which engage the rod and said rod is also provided with a locking pin aperture 15', which is adapted to receive a pin (not shown) whereby movement of the clutch block A toward the clutch-block B is prevented under certain conditions to be hereinafter explained. The inner end of the guide rod 15 carries a ring 15'' for engagement with a coupling hook 15''', which coupling hook is mounted upon the pivot bolt 13'.

As best shown in Fig. 4, when the cam levers 10 are at their extreme forward movement, their cam shoe portions 10'' exert a cable-gripping pressure upon the jaws 9, whereby said cable is firmly locked and this locking engagement is assisted by a coiled spring 18, one end of which is socketed within the heel of the cam lever, while the opposite end is opposed by a tongue 8'', which projects from the juxtaposed shouldered bolt 8'. Thus, when the cam levers are forced by their link connections in the opposite direction from that shown in Fig. 4, the springs 18 form yieldable stop buffers for said levers, whereby take-up movement of the entire clutch mechanism is had with relation to the cable, which cable would now be free from the grip of the jaw members 9.

From the foregoing description it is manifest that when the manipulating lever is in the extreme position shown in Fig. 1, the clutch member B has completed its forward slack take-up movement of the cable 11. Upon a reverse movement of the manipulating lever it is obvious that the clutch block B will be instantly freed from the cable 11, while the clutch-block A will simultaneously grip said cable and as it moves forward a second take-up operation will result. Hence it will be seen that the vibratory movement of the actuating lever will cause the clutch-blocks to alternately slide and grip the cable, whereby a rapid take-up movement is effected to pull the stump to which the cable 11 is attached and, owing to the simple lever connections, a minimum force applied to the actuating lever will produce a maximum power for quickly uprooting the stump.

When it is desired to free the end of cable 11 from its threaded engagement with the associated clutch-blocks, a pin (not shown) is fitted into the locking aperture 15' of the guide rod 15 and the coupling members 15'' and 15''' are connected. Thus the guide-rod is now made fast to the manipulating lever and by a slight movement of said lever, the cam levers of both clutch blocks will relieve the cable 11 of gripping strain, whereby the latter can be drawn clear of their engagement with said clutch-blocks.

While I have shown and described a simple exemplification of my invention in all its detail, it is obvious that I may, without departing from the spirit of my invention, vary such detail within the scope of skilled mechanics in order to accomplish the desired result.

I claim:

1. A take-up mechanism of the described character comprising an oscillatory lever, means for anchoring the same at its point of oscillation, a pair of tangentially arranged independent runner clutch-blocks, a link connection between one of the clutch-blocks and the lever below its point of oscillation, a link connection between the other clutch-block and said lever above its point of oscillation, a guide connecting the clutch-blocks, and means for locking the guide to the oscillatory lever.

2. A slack take-up mechanism of the described character comprising an actuating lever, a fixed fulcrum for the lever, a pair of tangentially arranged clutch-blocks each comprising a cheek-plate and an oscillatory cam lever adapted to exert gripping engagement upon a runner, a link connecting one of the cam levers and actuating lever above its fulcrum, and a link connecting the other cam lever and actuating lever below its fulcrum.

3. A slack take-up mechanism of the described character comprising an actuating lever, a fixed fulcrum for the lever, a pair of tangentially arranged clutch-blocks each comprising a cheek-plate and an oscillatory cam lever adapted to exert gripping engagement upon a runner, a link connecting one of the cam levers and actuating lever above its fulcrum, a link connecting the other cam lever and actuating lever below its fulcrum, a guide rod secured to one of the cheek-plates, and a slidable connection between the cheek-plate of the other clutch-block and guide-rod.

4. A slack take-up mechanism of the described character comprising an actuating lever, a fixed fulcrum for the lever, a pair of tangentially arranged clutch-blocks each comprising a cheek-plate and an oscillatory cam lever adapted to exert gripping engagement upon a runner, a link connecting one of the cam levers and actuating lever above its fulcrum, a link connecting the other cam lever and actuating lever below its fulcrum, a guide rod secured to one of the cheek-plates, a slidable connection between the cheek-plate of the other clutch-block and guide-rod, and means for connecting the guide-rod and actuating lever.

In testimony that I claim the foregoing I have hereunto set my hand at Escanaba in the county of Delta and State of Michigan in the presence of two witnesses.

ALFRED J. KIRSTIN.

Witnesses:
  FRANK G. SHEPECK,
  ALBERT T. BLOMBERG.